(12) United States Patent
Meguro

(10) Patent No.: US 6,271,992 B1
(45) Date of Patent: Aug. 7, 2001

(54) DISK CARTRIDGE

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,468

(22) PCT Filed: Jun. 4, 1998

(86) PCT No.: PCT/JP98/02474

§ 371 Date: Oct. 21, 1999

§ 102(e) Date: Oct. 21, 1999

(87) PCT Pub. No.: WO98/56000

PCT Pub. Date: Dec. 10, 1998

(30) Foreign Application Priority Data

Jun. 6, 1997 (JP) .................................................. 9-148770

(51) Int. Cl.[7] .................................................. G11B 23/03
(52) U.S. Cl. ............................................. 360/133; 369/291
(58) Field of Search ............................. 369/291; 360/133

(56) References Cited

U.S. PATENT DOCUMENTS 4,885,652 * 12/1989 Leonard et al. ..................... 360/133

FOREIGN PATENT DOCUMENTS

| | | |
|---|---|---|
| 0 161 720 | * 11/1985 | (EP) . |
| 60-70569 | 4/1985 | (JP) . |
| 61-066272 | * 4/1986 | (JP) . |
| 61-182969 | 11/1986 | (JP) . |
| 63-42080 | 2/1988 | (JP) . |
| 63-042079 | * 2/1988 | (JP) . |
| 63-42079 | 2/1988 | (JP) . |
| 3-205672 | * 9/1991 | (JP) . |
| 4-188481 | 7/1992 | (JP) . |
| 5-166330 | * 7/1993 | (JP) . |
| 8-221929 | * 8/1996 | (JP) . |
| 10-55647 | 2/1998 | (JP) . |
| 11-066801 | * 3/1999 | (JP) . |
| 98/54717 | * 12/1998 | (WO) . |

* cited by examiner

Primary Examiner—William Klimowicz
(74) Attorney, Agent, or Firm—Frommer Lawrence & Haug, LLP; William S. Frommer

(57) ABSTRACT

A disk cartridge comprising a center core at the central portion thereof with which it is chucked onto a rotary drive, a disk to be mounted onto the rotary drive and rotated at a rotation speed of at least 3,000 rpm, and a cartridge body for rotatably accommodating the disk. The cartridge body has a center opening in the central part of its lower surface through which the center core of the disk is exposed outside, a pair of recording/reproducing openings in opposing positions of the upper and lower surfaces of the cartridge body through which at least a part of the signal recording area of the disk is exposed outside in a radial direction, and a partition wall formed between the upper and lower surfaces of the cartridge body to enclose the almost entire outer periphery of the disk. The partition wall has a notch at a position downstream, in the disk rotation direction, of the recording/reproducing openings, which notch communicates through an exhaust passage to an exhaust opening formed in the front wall of the cartridge body.

6 Claims, 9 Drawing Sheets

DISK CARTRIDGE

TECHNICAL FIELD

The present invention relates to a disc cartridge which is constructed to rotatably install in a cartridge body thereof a disc used as a recording medium for recording information signal, and more particularly to a disc cartridge of a type which, by practically using a centrifugal force generated when the disc is rotated at over 3000 rpm, discharges from the cartridge body thereof dust which has been collected on the disc.

TECHNICAL BACKGROUND

Hitherto, there have been developed disc cartridges of a type which comprises a magnetic disc which includes a flexible disc base having a magnetic layer lined thereon and a cartridge body which includes upper and lower body halves coupled to rotatably install therein the magnetic disc.

On an inner surface of each of the upper and lower body halves of the cartridge body, there is arranged a protection sheet made of a nonwoven fabric cloth or the like. The protection sheet arranged on the inner surface of the upper body half is partially protruded toward the magnetic disc by a plurality of comb-shaped projections formed on the inner surface of the upper body half. While, the protection sheet arranged on the inner surface of the lower body half is partially protruded toward the disc cartridge by a lifter, made of a thin blade spring, which is arranged on the inner surface of the lower body half at a position facing the projections of the upper body half. That is, due to the projections and the lifter, respective portions of the protection sheets arranged on the inner surfaces of the upper and lower body halves are protruded toward each other by such a degree as to contact the signal recording surfaces of the magnetic disc.

When the disc cartridge having the above-mentioned construction is put into a disc player and the magnetic disc in the cartridge body is chucked and driven by a disc driving mechanism of the disc player, the protruded portions of the protection sheets contact the rotating magnetic disc to remove dust therefrom.

A larger portion of each projection sheet other than the protruded portion functions to prevent the signal recording surfaces of the magnetic disc from directly contacting with hard inner surfaces of the cartridge body and from being damaged therefrom.

In the above-mentioned disc cartridge wherein by positively contacting the protection sheets with the magnetic disc, dusts on the magnetic disc can be removed, the dusts removed from the magnetic disc are caught by the protection sheets and attached thereto. If under this condition the magnetic disc is rotated, it tends to occur that the magnetic disc is damaged by the dust attached to the protection sheets.

In the above-mentioned disc cartridge, due to provision of the projections and the lifter, parts of the protection sheets are protruded toward the magnetic disc to contact therewith. Thus, load produced when the magnetic disc is rotated is increased. In a disc player by which the above-mentioned cartridge disc is played, there is a need of using a large-sized driving motor, as a part of a disc driving mechanism, for generating a larger driving torque for obtaining a stable rotation of the magnetic disc.

Furthermore, when, in the above-mentioned disc cartridge, the upper and lower body halves of the cartridge body are subjected to deformation such as warping or the like, it tends to occur that, due to provision of the projections and the lifter, the protection sheets are strongly pressed against the magnetic disc thereby to increase the load needed for driving the magnetic disc.

When the load of the magnetic disc is increased, the driving torque is also increased, which induces application of a marked load to the driving motor of the disc driving mechanism thereby inducing a possibility of having an unstable rotation of the magnetic disc.

In a magnetic disc with a high density recording capacity, the rotation speed of the disc is determined high. With increase of the rotation speed of the magnetic disc, the friction between the magnetic disc and the protection sheets contacting the magnetic disc increases, which tends to cause a damage of the signal recording surfaces of the magnetic disc. In order to rotate the magnetic disc at a higher speed, it is necessary to increase the rotation speed of the driving motor of the disc driving mechanism. When, in the driving motor, the rotation speed increases, the driving torque becomes reduced. Thus, a stable rotation of the motor is not obtained even if increase in the load applied to the magnetic disc is just a small and thus in this case, the magnetic disc can be rotated at a desired rotation speed. Furthermore, in this case, appropriate recording and replaying of information signal is not expected from the magnetic disc.

An object of the present invention is to provide a disc cartridge which can remove dusts from a disc by using rotation of the disc without aid of members which contact the disc.

Another object of the present invention is to provide a disc cartridge wherein a disc is prevented from directly contacting with a cartridge body so that the disc is protected.

Still another object of the present invention is to provide a disc cartridge wherein rotation of a disc is carried out without applying a drive motor, which constitutes a disc drive mechanism, with a marked load.

Further object of the present invention is to provide a disc cartridge which can protect a disc installed in a cartridge body and assure a stable rotation of the disc in the body.

Further object of the present invention is to provide a disc cartridge which can discharge dusts from a cartridge body to the outside and prevent invasion of dusts into the cartridge body from the outside.

DISCLOSURE OF INVENTION

In the invention defined by claim 1, there is provided a disc cartridge which comprises a disc having at a center portion thereof a center core for being chucked by a drive mechanism, the disc being rotated at a speed higher than 3000 rpm when put on and driven by the drive mechanism; and a cartridge body having the disc rotatably installed therein, the cartridge body having at a center portion of a lower part thereof a center opening through which the center core is exposed to the outside of the cartridge body, and having at mutually facing portions of upper and lower parts thereof paired writing and/or reading apertures each extending radially outward to expose at least a part of the signal writing zone of the disc to the outside, and having a shutter member for opening and closing the writing and/or reading apertures, the shutter member having a generally U-shaped cross section, and having between the upper and lower parts thereof a partition wall which surrounds substantially entire periphery of the disc, the partition wall having a cut portion near the writing and/or reading apertures at a position downstream of the writing and/or reading apertures with respect to the rotation direction of the disc, the cut portion being connected through a discharge passage to a discharge opening formed in a front wall of the cartridge body, and the discharge opening being located at a position which is covered by a cartridge holding portion of the shutter member when the shutter member is in a position to close the writing and/or reading apertures.

Accordingly, when, like in non-use condition of the disc cartridge, the writing and/or reading apertures are closed by the shutter member, the discharge opening is also closed by the shutter member. Thus, in such non-use condition of the disc cartridge, that is, when the disc cartridge is contained in a container, entering of dusts into the cartridge body is suppressed. When the writing and/or reading apertures become open due to insertion of the disc cartridge into the disc drive player, the discharge opening is opened. When the disc is rotated at a higher speed, air is sucked into the cartridge body. Under rotation of the disc, the sucked air forms a spirally flowing air flow which flows radially outward between the lower surface of the cartridge body and the disc while blowing off any dusts collected on the disc and flows through the cut portion of the partition wall which surrounds the periphery of the disc and flows through the discharge passage and discharges into the outside of the cartridge body from the discharge opening together with the dusts. Furthermore, by both the pressure of air which is sucked into the cartridge body from the center opening and flows between a lower surface of the cartridge body and the disc and the pressure which is generated at an upper side of the disc due to the air flow, the disc is floatably held at its upper and lower surfaces and thus undesired vibration of the disc under rotation thereof is suppressed.

In the invention defined by claim 2, there is provided a disc cartridge as defined by claim 1, in which the cartridge body is provided at inner surfaces of the upper and lower parts thereof with protection sheets, the protection sheets being bonded to the inner surfaces of the upper and lower parts, so that when the center core of the disc is chucked by the disc drive mechanism, the protection sheets are kept away from the disc without contacting the same.

Accordingly, even when the disc is rotated at a higher speed, undesired wearing of the disc, which would be caused by the contact between the disc and the protection sheets, is suppressed and thus, durability of the disc is increased and the load applied to the drive motor of the disc drive mechanism is reduced.

In the invention defined by claim 3, there is provided a disc cartridge as defined by claim 1, in which the discharge passage is formed with an air guide wall which extends from a downstream end of the cut portion of the partition wall with respect to the rotation direction of the disc to the discharge opening.

Accordingly, the air flow generated upon rotation of the disc is forced to impinge upon the air guide wall and guided to run along the same toward the discharge opening and discharged to the outside of the cartridge body from the discharge opening.

In the invention defined by claim 4, there is provided a disc cartridge as defined by claim 3, in which the air guide wall is arranged perpendicular to the direction in which the air flow generated upon rotation of the disc runs.

Thus, upon impinging upon the air guide wall, the air flow is divided into two parts, one part flowing along the guide wall toward the discharge opening and the other part flowing along the guide wall toward the cut portion.

In the invention defined by claim 5, there is provided a disc cartridge as defined by claim 3, in which the air guide wall is so inclined that an incidence angle of the direction of the air flow relative to the air guide wall, which faces toward the discharge opening, shows an obtuse angle.

Accordingly, over 50% of the air flow impinging upon the air guide wall is forced to flow along the guide wall toward the discharge opening.

In the invention defined by claim 6, there is provided a disc cartridge as defined by claim 3, in which at least one end portion of the air guide wall at the side of the cut portion of the partition wall is so inclined that an incidence angle of the air flow relative to the end portion, which faces toward the discharge opening, shows an obtuse angle.

Accordingly, over 50% of the air flow impinging upon the air guide wall is forced to flow along the guide wall toward the discharge opening while preventing the air flow from entering the disc containing portion formed within the partition wall.

PREFERRED EMBODIMENTS OF THE INVENTION

Figure 1:
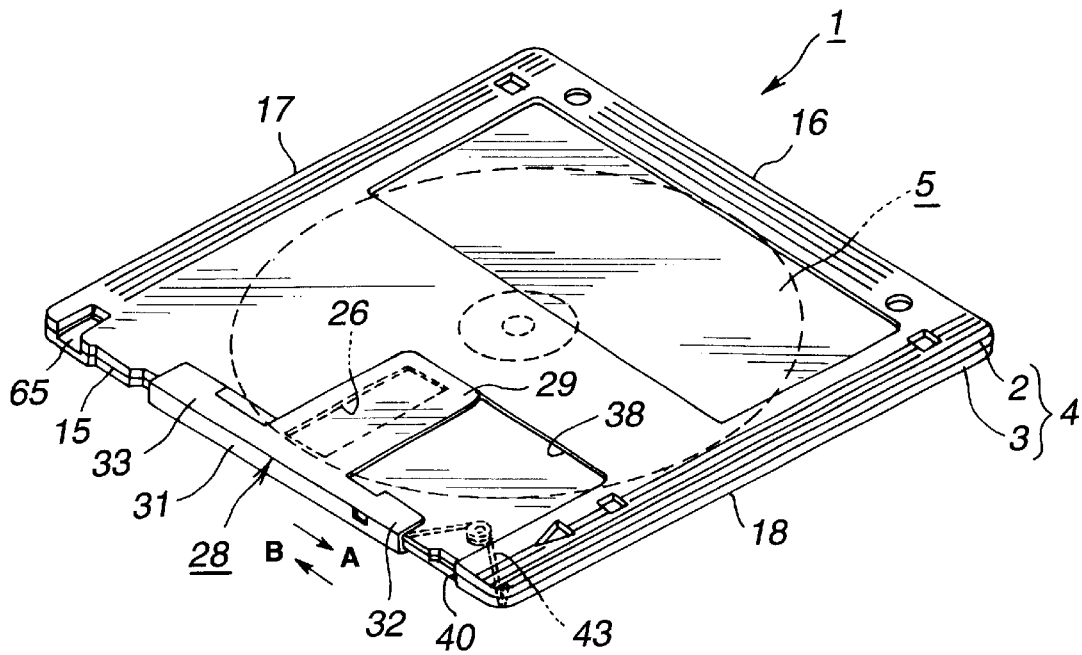
FIG. 1 is a perspective view of a disc cartridge of the present invention, which is viewed from an upper position of the cartridge.
Figure 2:
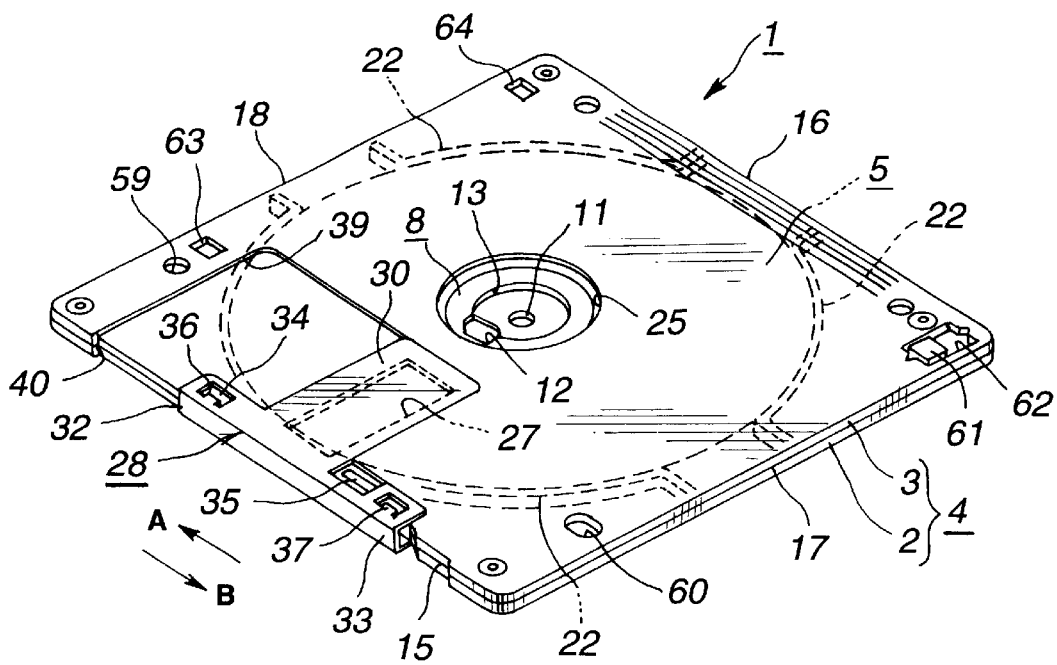
FIG. 2 is a perspective view of the disc cartridge, which is viewed from a lower position of the cartridge.
Figure 3:
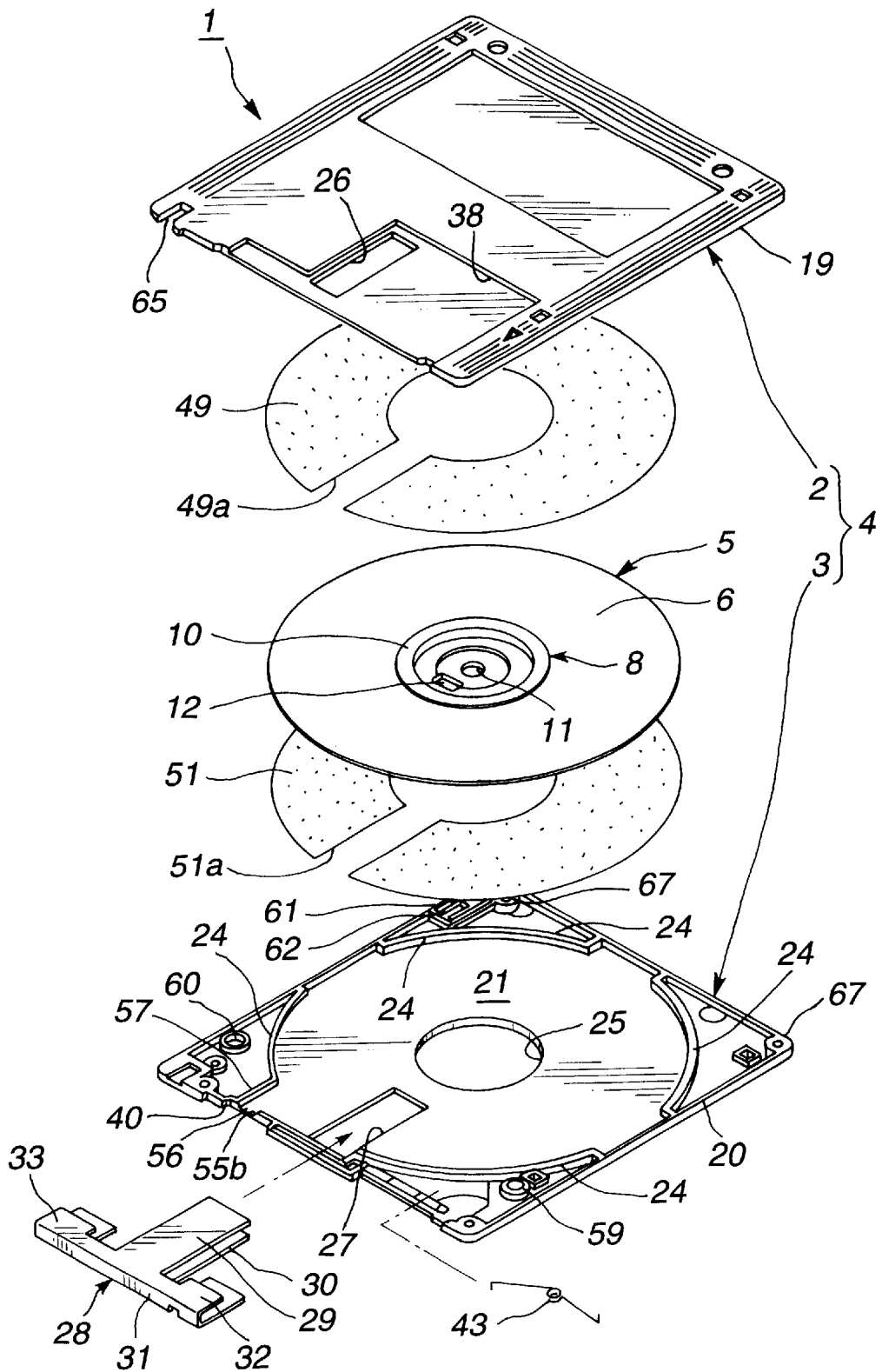
FIG. 3 is an exploded perspective view of the disc cartridge.

As is seen from FIGS. 1, 2 and 3, a disc cartridge 1 according to the present invention comprises upper and lower body halves 2 and 3 each being generally rectangular in shape and made of plastics via injection molding. These halves are combined in a face-to-face coupling to constitute a cartridge body 4. Within the cartridge body 4, there is installed a magnetic disc which serves as a recording medium for recording information signal.

As is seen from FIG. 3, the magnetic disc 5 comprises a disc proper 6 of 3.5 inch in diameter, which is made of a flexible thin plastic film and lined at both surfaces thereof with magnetic layers. As is seen from FIG. 4, at a center portion of the disc proper 6, there is provided a center opening 7, and a center core 8 is connected to the disc proper in a manner to engage with the center opening 7. The center core 8 is made of a magnetic material such as metal, so that when the magnetic disc 5 is put on a disc drive mechanism arranged in a disc player, the center core 8 is magnetically attracted by a magnet mounted on the disc drive mechanism.

Figure 4:
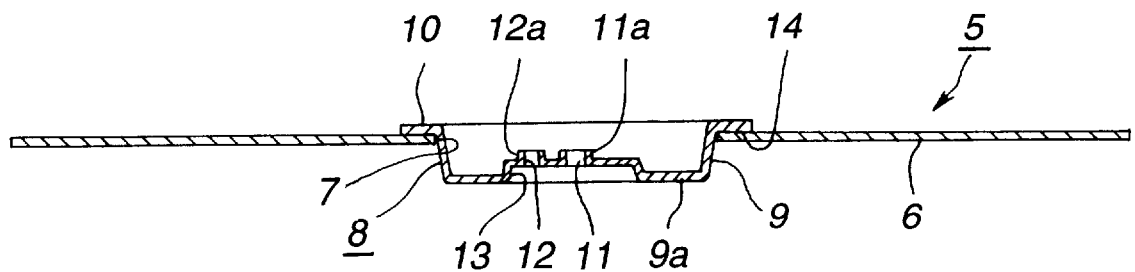
FIG. 4 is a sectional view showing a magnetic disc installed in the disc cartridge of the invention.

As is seen from FIG. 4, the center core 8 comprises a short cylindrical projected portion 9 which has a flat center portion and a flange portion 10 which is integrally connected to an upper end of the projected portion 9 to serve as a connecting means to the disc proper 6. At a bottom portion 9a of the projected portion 9, there are formed both a spindle shaft engaging opening 11 with which a spindle shaft of the disc driving mechanism engages and a drive pin engaging opening 12 with which a drive pin possessed by the disc driving mechanism engages. Around the spindle shaft engaging opening 11 and the drive pin engaging opening 12, there are provided raised walls 11a and 12a. With these raised walls 11a and 12a, the spindle shaft and the drive shaft can be held by larger supporting areas and thus the engagement between the spindle shaft engaging opening 11 and the spindle shaft and that between the drive pin engaging opening 12 and the drive pin are assuredly and stably made.

At the bottom portion 9a of the projected portion 9, there is formed a disc mounting portion 13 which is put on a disc table of the disc driving mechanism. The disc mounting portion 13 is defined by providing the bottom portion 9a of the projected portion 9 with a depression and is mounted on the disc table in a manner to fit therewith thereby to suppress a displacement of the magnetic disc 5 relative to the disc table.

The center core 8 having the above-mentioned structure is connected to the disc proper 6 in such a manner that the projected portion 9 thereof is fitted in the center opening 7 of the disc proper 6 having the flange portion 10 put on one side of the disc proper 6. With an adhesive material 14 applied between the flange portion 10 and the disc proper 6, the center core is bonded to the disc proper 6.

The magnetic disc 5 employed in this embodiment has a storage capacity higher than 100 MB and is to be mounted on the disc driving mechanism for rotation at a speed higher than 3000 rpm.

As is seen from FIGS. 1, 2 and 3, the cartridge body 4 which houses therein the magnetic disc 5 having the above-mentioned structure comprises upper and lower paired rectangular body halves 2 and 3 which are coupled having their mutually facing surfaces mated, each half 2 or 3 being constructed of an injection-molded plastic. As is seen from FIGS. 5 and 6, around peripheries of the upper and lower body halves 2 and 3 which constitute the cartridge body 4, there are formed raised walls 19 and 20 which mate with each other to form a front wall 15, a back wall 16 and opposed side walls 17 and 18 of the cartridge body 4.

Figure 5:
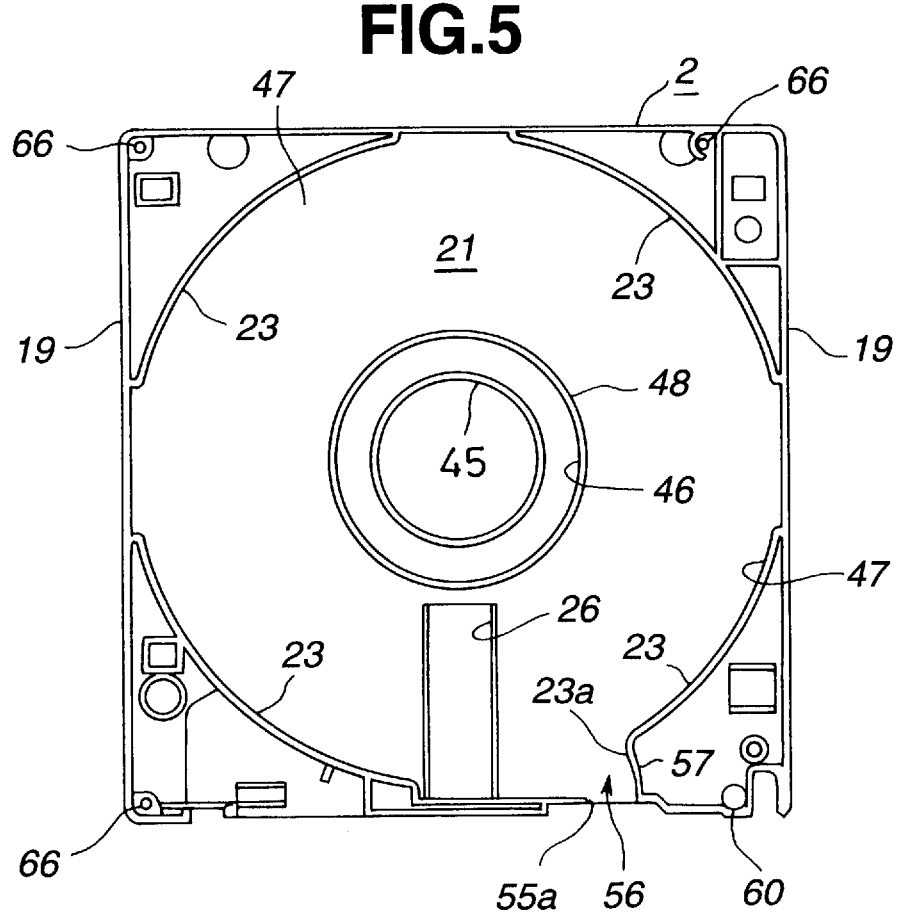
FIG. 5 is a plan view of an upper body half of the disc cartridge of the invention, showing an inner surface of the upper body half.
Figure 6:
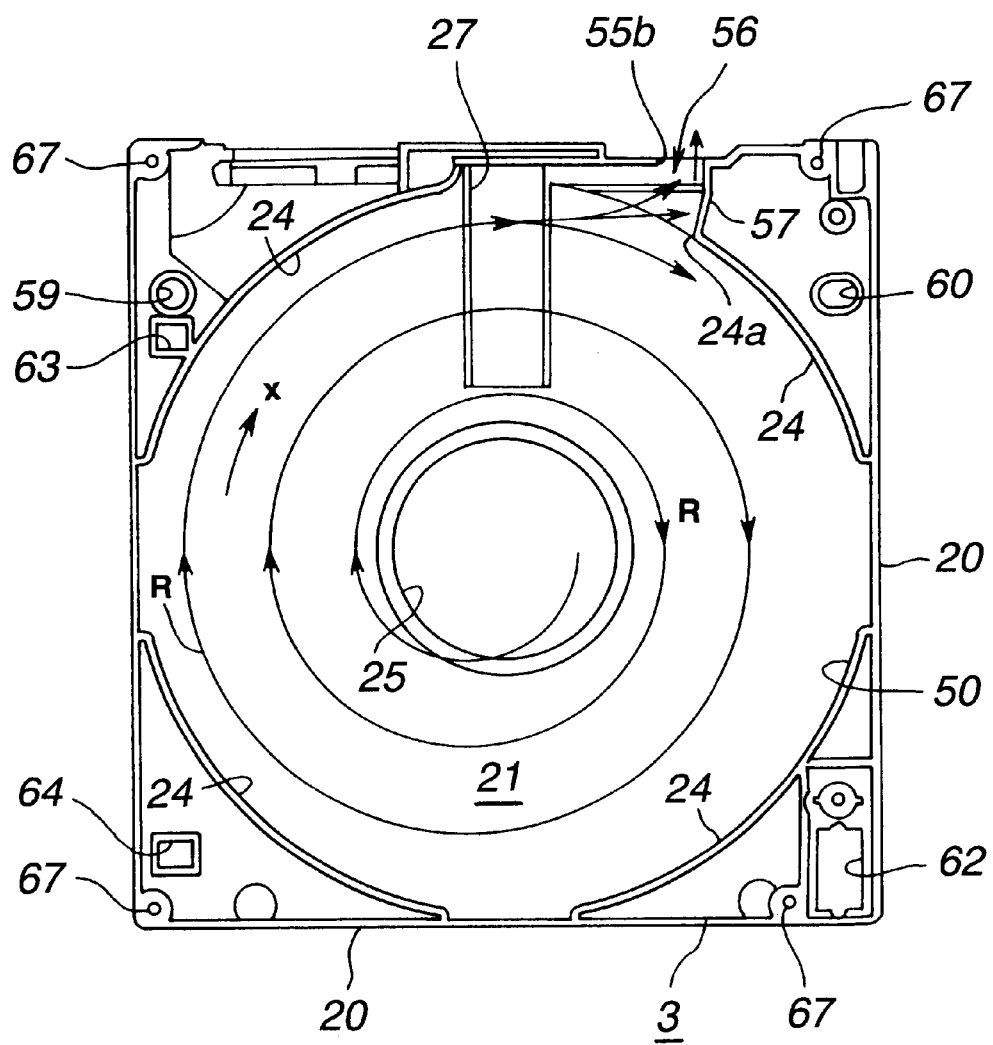
FIG. 6 is a plan view of a lower body half of the disc cartridge of the invention, showing an inner surface of the lower body half.

As is seen from FIGS. 5 and 6, on an inner surface of each of the upper and lower body halves 2 and 3, there is formed a partition defining wall 23 or 24 which constitutes a partition wall 22 by which a disc containing portion 21 for rotatably receiving therein the magnetic disc 5 is formed. As is seen from FIGS. 6 and 7, each of these partition defining walls 23 and 24 is shaped circular and sized to make an inscribed circle of the upper or lower body half 1 or 2. As is seen from FIG. 7, by mating these partition defining walls, there is formed the partition wall 22. An area surrounded by the partition wall 22 is served as the disc containing portion 21. Since the partition wall 22 defining the disc containing portion 21 is provided by mating the circular partition defining walls 23 and 24 each being sized to make an inscribed circle of the corresponding rectangular body half 1 or 2, the partition wall 22 can surround substantially all periphery of the magnetic disc 5 installed in the disc containing portion 21.

As is seen from FIGS. 2 and 3, at a center portion of the lower body half 3 which constitutes a lower side part of the cartridge body 4, there is formed a circular center opening 25 which receives therein the projected portion 9 of the center core 8 connected to the magnetic disc 5 installed in the cartridge body 4. The center opening 25 is provided by only the lower body half 3. That is, as is seen from FIGS. 1 and 3, the center portion of an upper side part of the cartridge body 2, which is constructed by the upper body half 2, is closed.

As is seen from FIGS. 1, 2 and 3, the upper body half 2 constituting the upper side part of the cartridge body 4 and the lower body half 3 have at mutually facing portions first and second writing and/or reading apertures 26 and 27 respectively, each extending radially outward to expose at least a part of a signal writing zone of the magnetic disc installed in the cartridge body 4. These writing and/or reading apertures 26 and 27 are each positioned at a middle portion of the cartridge body 4 with respect to the right and left sides of the body 4. Each aperture 26 or 27 is shaped rectangular and extends from a near portion of the center opening 25 to a near portion of the front wall 15 of the cartridge body 4. As is seen from FIGS. 5 and 6, each of the first and second writing and/or reading apertures 26 and 27 from the disc containing portion 21 to a near portion of the front wall 15, so that a magnetic head which constitutes an information signal writing and/or reading means and enters into the cartridge body 4 through the apertures 26 and 27 can run to the outer periphery of the magnetic disc 5 installed in the cartridge body 4.

As is seen from FIGS. 1 and 2, to the cartridge body 4, there is movably connected a shutter member 28 which can open and close the first and second writing and/or reading apertures 26 and 27. The shutter member 28 is produced by cutting out a piece from a thin metal plate and bending the piece. As is seen from FIG. 3, the shutter member comprises a first shutter portion 29 which opens and closes the first writing and/or reading aperture 26 formed in the upper side of the cartridge body 4, a second shutter portion 30 which opens and closes the second writing and/or reading aperture 27 formed in the lower side of the cartridge body 4 and a connecting plate portion 31 which connects the first and second shutter portions 29 and 30 in such a manner that the first and second shutter portions 29 and 30 extend in parallel with each other. The connecting plate portion 31 is so constructed that upon connection of the shutter member 28 to the cartridge body 4, the connecting plate portion 31 projects in the directions of the opposite sides of each of the first and second shutter portions 29 and 30 while protruding toward the front wall 15 of the cartridge body 4. At the projected portions of the connecting plate portion, there are provided first and second cartridge holding portions 32 and 33. As is seen from FIGS. 1 and 2, each of the cartridge holding portions 32 and 33 is provided by forming at each lateral end of the connecting plate portion 31 portions which project in a direction parallel with the extending direction of the first and second shutter portions 29 and 30. That is, each of the cartridge holding portions has a generally U-shaped cross section so as to hold the front wall 15 of the cartridge body 4. The projected portions of the connecting plate portion 31 at the side of the second shutter portion 30, which partially constitute the first and second cartridge holding portions 32 and 33, are formed with a pair of engaging bent pieces 36 and 37 which are slidably engaged with guide grooves 34 and 35 which are formed on the lower side of the cartridge body 4 at both sides of the second writing and/or reading aperture 27 to extend along the front wall 15 of the cartridge body 4.

As is seen from FIGS. 1 and 2, the shutter member 28 having the above-mentioned structure is mounted to the cartridge body 4 from the front wall 15 in such a manner that the first and second shutter portions 29 and 30 extend over the first and second writing and/or reading apertures 26 and 27 respectively and the first and second cartridge holding portions 32 and 33 are engaged with the front wall 15 of the cartridge body 4 having the engaging bent pieces 36 and 37 slidably engaged with the guide grooves 34 and 35. The shutter member 28 connected to the cartridge body 4 in the above-mentioned manner is moved while being guided by the engaging pieces 36 and 37 engaged with the guide grooves 34 and 35, in the directions of the arrows A and B of FIGS. 1 and 2 between a position where the first and second shutter portions 29 and 30 close the first and second writing and/or reading apertures 26 and 27 respectively and another position where the shutter portions open the first and second writing and/or reading apertures 26 and 27.

As is seen from FIGS. 1 and 2, on the upper and lower surfaces of the cartridge body 4, there are formed shutter moving recesses 38 and 39 each extending from the periphery of the first or second writing and/or reading aperture 26 or 27 toward one side wall 16 of the cartridge body 4. Furthermore, on the front wall 15 of the cartridge body 4, there is formed a shutting moving recess 40 throughout the distance for which the shutter member 28 moves. The depth of the shutting moving recess 40 corresponds to the thickness of the connecting plate portion 31. The first and second shutter portions 29 and 30 of the shutter member 28 are received in the shutter moving recesses 38 and 39 and the connecting plate portion 31 of the shutter member 28 is received in the shutter moving recess 40, so that the shutter member 28 is flush with the cartridge body 4 without projecting from the outer surface of the cartridge body 4.

The shutter member 28 connected to the cartridge 4 is biased in a direction to close the first and second writing and/or reading apertures 26 and 27, that is, in the direction of the arrow B of FIGS. 1 and 2, by means of a twisted coil spring 43 which is a biasing means mounted in the cartridge body 4. As is seen from FIG. 3, the twisted coil spring 43 is arranged in one corner portion of the cartridge body 4 where the shutter member 28 is positioned when the same opens the first and second writing and/or reading apertures 26 and 27. The twisted coil spring 43 is installed in the cartridge body 4 with one end hooked to the cartridge body and the other end hooked to a spring holding portion provided on the first cartridge holding portion 32, so that the shutter member 28 is biased to move in the direction of the arrow B of FIGS. 1 and 2, that is, in the direction to close the first and second writing and/or reading apertures 26 and 27.

Figure 7:
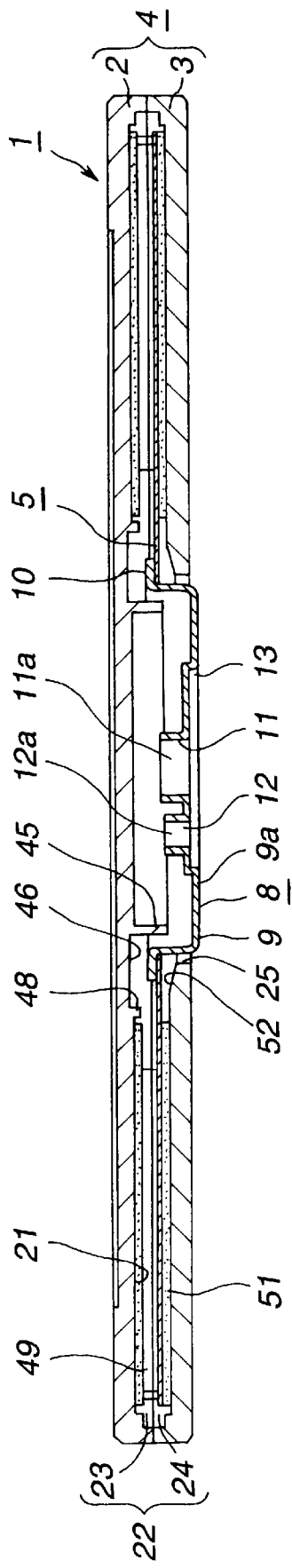
FIG. 7 is a sectional view of the disc cartridge of the invention.

As is seen from FIG. 7, at a central portion of the inner surface of the upper body half 2 of the cartridge body 4, there is formed a disc displacement suppressing rib 45 which suppresses a displacement of the magnetic disc 5. The disc displacement suppressing rib 45 is shaped cylindrical and has such an outer diameter as to enter the projected portion 9 of the center core 8 of the magnetic disc 5. As is seen from FIG. 7, when the rib 45 is inserted into the projected portion 9, a displacement of the magnetic disc 5 in a lateral direction is suppressed so that undesired deformation of the magnetic disc 5, which would occur when a peripheral portion of the disc 5 collides against the partition wall 22, is prevented and thus the flexible magnetic disc 5 is protected.

When the magnetic disc 5 is moved up toward the upper body half 2, the bottom portion 9a of the projected portion 9 of the center core 8 is brought into contact with the disc displacement suppressing rib 45, so that the flange portion 10 of the center core 8 which is positioned on the upper side of the disc 5 is prevented from contacting the inner surface of the upper body half 2. With this, undesired phenomenon wherein the plastic upper body half 2 is scraped by the metallic center core 8 to produce powder is suppressed.

Around the disc displacement suppressing rib 45, there is provided an annular recess 46 into which the flange portion 10 of the center core 8 is received when the magnetic disc 5 is supported by the disc displacement suppressing rib 45. Due to provision of the annular recess 46, undesired contact of the flange portion 10 with the inner surface of the upper body half 2 can be prevented irrespective of a thinner construction of the cartridge body 4.

Furthermore, on the inner surface of the upper body half 2, there is provided a ring-shaped rib 48 which surrounds the annular groove 46 and, together with the partition defining wall 23, constitutes a protection sheet mounting portion 47. The protection sheet mounting portion 47 defined between the partition defining wall 23 and the rib 48 is shaped flat and has a magnetic disc protection sheet 49 arranged thereon, the sheet 49 being made of a nonwoven fabric cloth such as felt or a lubrication sheet. As is seen from FIG. 8, the protection sheet 49 is fixed or bonded at its one major surface to the protection sheet mounting portion 47 by means of heat welding, supersonic welding or adhesive. Since the protection sheet 49 is applied or bonded to the protecting sheet mounting portion 47 which is flat, the surface which faces the disc proper 6 in the upper body half 2 becomes flat.

Figure 8:
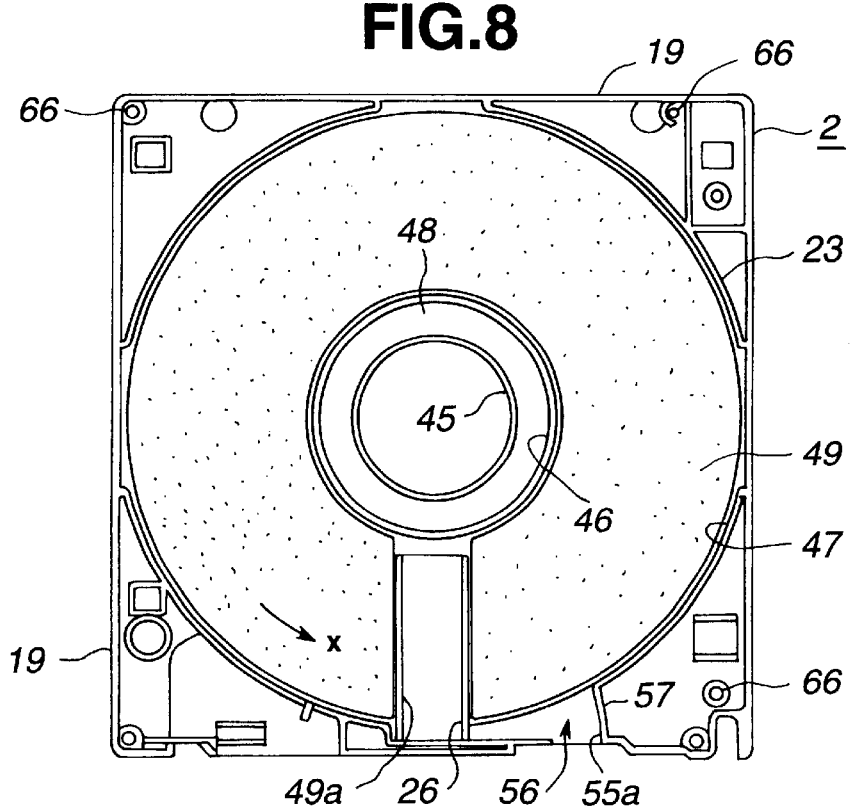
FIG. 8 is a plan view of the upper body half with a protection sheet attached thereto.

As is seen from FIGS. 3 and 8, the protection sheet 49 is provided, at a portion corresponding to the first writing and/or reading aperture 26, with a cut 49a for exposing the aperture 26.

A protection sheet mounting portion 50 which is the zone surrounded by the partition defining wall 24 of the lower body half 3 has an inner surface shaped flat. Similar to the protection sheet 49 applied to the upper body half 2, a magnetic disc protection sheet 51 having at a portion corresponding to the second writing and/or reading aperture 27 a cut 51a is applied to the inner surface of the protection sheet mounting portion 50. The protection sheet 49 is made of a nonwoven fabric cloth such as felt or a lubrication sheet. As is seen from FIG. 9, also this protection sheet 51 is fixed or bonded at its one major surface to the protection sheet mounting portion 50 of the lower body half 3 by means of heat welding, supersonic welding or adhesive. Since the protection sheet 51 is applied or bonded to the protecting sheet mounting portion 50 which is flat, the surface which faces the disc proper 6 in the lower body half 3 becomes flat.

Figure 9:
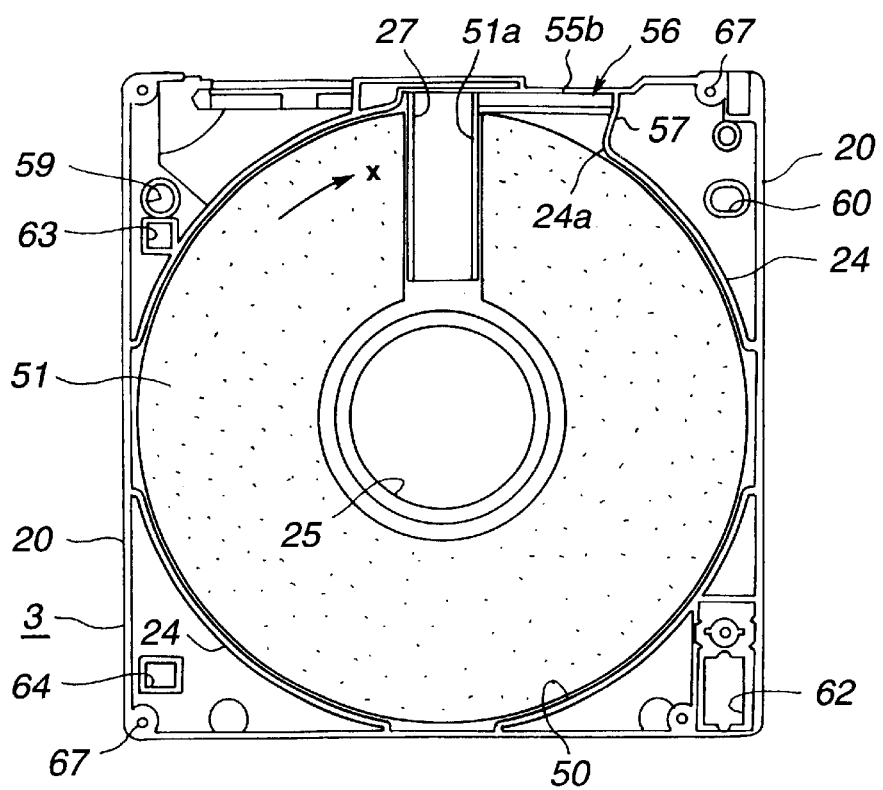
FIG. 9 is a plan view of the lower body half with a protection sheet attached thereto.

As is seen from FIGS. 3 and 9, the protection sheet 51 is provided, at a portion corresponding to the second writing and/or reading aperture 27, with a cut 51a for exposing the aperture 27.

If lubrication sheets are used for the protection sheets 49 and 51, dusts can be much smoothly discharged to the outside from the disc containing portion 21.

As is seen from FIG. 7, the inner surface of the lower body half 3 is formed around the center opening 25 with an inclined surface 52. This inclined surface 52 is provided for accommodating the thicker flange portion 10 of the center core 8.

As is described hereinabove, the protection sheets 49 and 51 are applied to the flat inner surfaces of the upper and lower body halves 2 and 3, which face the disc proper 6. Within the cartridge body 4 constructed by coupling the upper and lower body halves 2 and 3, there is defined the disc containing portion 21 as shown in FIG. 7 which has a space in which the magnetic disc 5 can rotate is without contacting the inner surfaces of the cartridge body 4.

Figure 10:
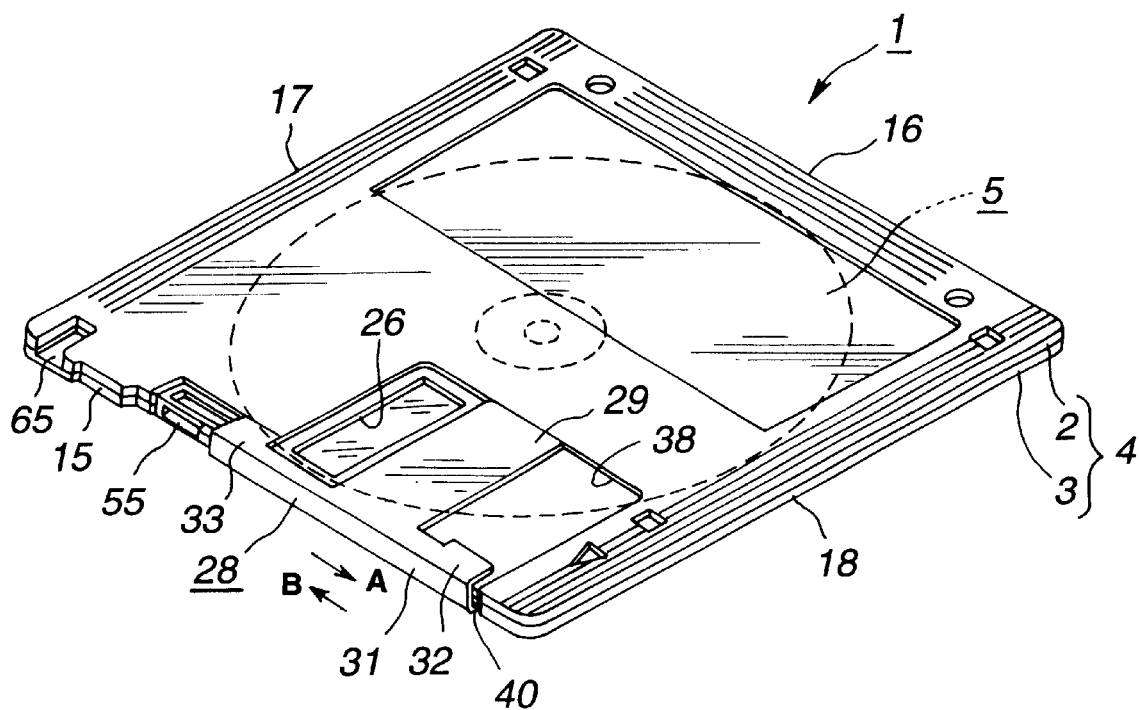
FIG. 10 is a perspective view of the disc cartridge of the invention, showing a condition wherein a discharge opening is kept open.

Now, it is to be noted that in the disc cartridge 1 of the present invention, there are formed a discharge opening 55 and a discharge passage 56 through which air in the disc containing portion 21 surrounded by the partition wall 22 is discharged to the outside of the cartridge body 4. As is seen from FIG. 10, the discharge opening 55 is provided by cutting a part of the front wall 15 of the cartridge body 7, so that as is seen from FIGS. 1 and 2, when the shutter member 28 is in the position to close the first and second writing and/or reading apertures 26 and 27, the discharge opening 55 is covered with a part of the shutter member 28, and as is seen from FIG. 10, when the shutter member 28 is in the position to open the first and second writing and/or reading apertures 26 and 27, the discharge opening 55 is opened by the shutter member.

That is, the discharge opening 55 is provided at a portion which is covered by the second cartridge holding portion 33 when the shutter member 28 is in the position to close the first and second writing and/or reading apertures 26 and 27 as is shown in FIGS. 1 and 2, the portion 33 projecting toward the sides of the first and second shutter portions 26 and 27. The discharge opening 55 is positioned at an opposite side of the portion where the coil spring 43 for biasing the shutter member 28 in the direction to close the first and second writing and/or reading apertures 26 and 27 is provided, with respect to the shutter member 28.

As is seen from FIGS. 5 and 6, the discharge opening 55 is provided by providing mutually facing portions of the raised walls 19 and 20 of the front wall 15 of the cartridge body 4 with respective recesses 55a and 55b and by mating tops of the raised walls 19 and 20 with each other.

As is understood from FIGS. 1 and 2, the discharge opening 55 is provided at the position which is covered with a part of the shutter member 28 when the shutter member 28 is in the position to close the first and second writing and/or reading apertures 26 and 27. Accordingly, when, like in case wherein the disc cartridge 1 is kept in a container, the cartridge is kept away from a recording/reading player, entering of dusts into the cartridge body 4 through the discharge opening 55 is suppressed.

The discharge passage 56 fluidly connects the disc containing portion 21 and the discharge opening 55, and as is seen from FIGS. 5 and 6, the discharge passage 56 through which air in the disc containing portion 21 is led to the discharge opening 55 fluidly connects cuts 23a and 24a, which are provided at a portion downstream of the above-mentioned writing and/or reading apertures 26 and 27 of the partition defining walls 23 and 24 constituting the partition wall 22 by which the disc containing portion 21 is defined, with the discharge opening 55 which is provided in the front wall 15 of the cartridge body 4.

As is seen from FIGS. 8 and 9, the discharge passage 56 is provided with an air guide wall 57 which extends from an end of the cuts 23a and 24a of the partition defining walls 23 and 24, that is, a downstream end with respect to the rotation direction "x" of the disc, to one end of the above-mentioned discharge opening 55.

When the cartridge body 4 is set in a disc drive device and the drive device starts to operate, the magnetic disc 5 in the cartridge body 4 is rotated in the direction "x" of FIG. 6. When the magnetic disc 5 is rotated in the direction "x" of FIG. 6, there is produced in the disc containing portion 21 a spiraling air flow "R" which runs spirally outward from the center opening 25 together with the rotation of the magnetic disc 5.

During this air flow, the air guide wall 57 assuredly guides the air flow from the disc containing portion 21 toward the discharge opening 55. For achieving the assured air guide, the air guide wall 57 extends from one end of the discharge passage 56 which faces against the air flow "R", that is, as is described hereinabove, from the end of the cuts 23a and 24a of the partition defining walls 23 and 24, that is, the downstream end with respect to the rotation direction "x" of the disc, to one end of the above-mentioned discharge opening 55. With the air guide wall 57 provided at the position to face against the air flow "R", the air flow "R" spirally outwardly running from the center portion of the disc containing portion 21 is forced to impinge upon the air guide wall 57 as is seen from FIG. 6, resulting in that the air flow is guided by the air guide wall 57 toward the discharge opening 55, and discharged to the outside of the cartridge body 4 from the discharge opening 55.

Since the air in the disc containing portion 21 is discharged to the outside of the cartridge body 4 upon rotation of the magnetic disc 5, dusts which have been entered the disc containing portion 21 can be discharged to the outside of the cartridge body 4 together with the air.

Figure 11:
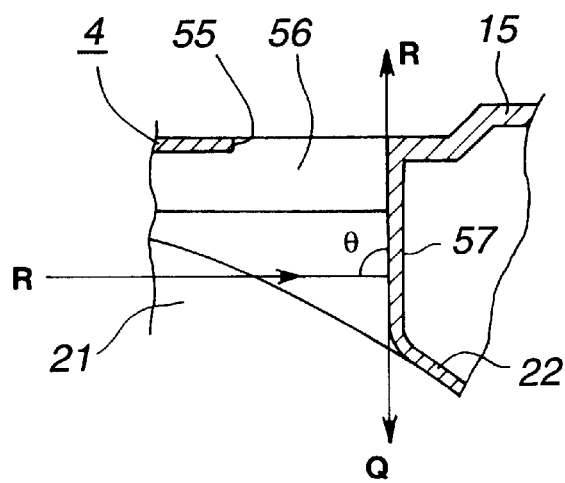
FIG. 11 is a plan view of a portion having the discharge opening and a discharge passage, which are provided in the cartridge body.

If desired, as is seen from FIG. 11, the air guide wall 57 may be arranged perpendicular to the discharge opening 55 provided in the front wall 15 of the cartridge body 4. However, as is understood from FIG. 11, in this case, due to presence of the air guide wall 57 arranged perpendicular to the discharge opening 55, the air flow "R" spirally flowing in the disc containing portion 21 is forced to impinge totally upon the air guide wall 57, so that a part "Q" of the air flow which has impinged upon the air guide wall 57 is directed toward the disc containing portion 21. In this case, the air flow "R" can not be appropriately guided to the discharge opening 55, and thus, it tends to occur that the dusts in the air flow "R" enter the disc containing portion 21.

Figure 12:
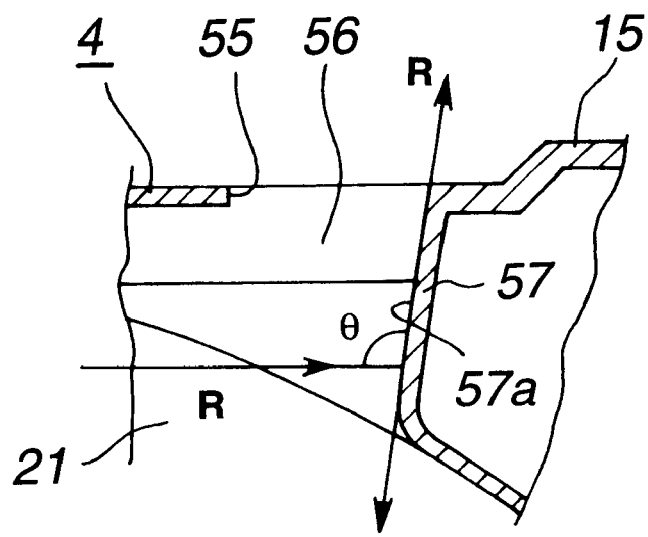
FIG. 12 is a plan view of a portion having another discharge opening and another discharge passage, which are provided in a modification of the cartridge body.
Figure 13:
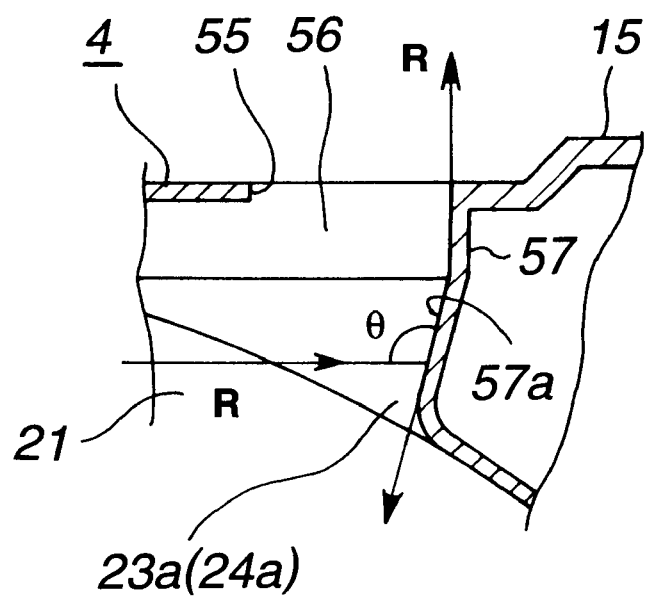
FIG. 13 is a plan view of a portion having still another discharge opening and still another discharge passage, which are provided in another modification of the cartridge body.

In order to more assuredly guide the air in the disc containing portion 21 toward the discharge opening 55, an inclined arrangement as shown in FIG. 12 may be employed. That is, as is shown in the drawing, in this arrangement, the air guide wall 57 is so inclined that an incidence angle "θ" of the direction of the air flow "R" relative to the air guide wall 57, which faces toward the discharge opening 55, shows an obtuse angle. In this inclined arrangement, over 50% of the impinging air is guided toward the discharge opening 55, and thus the dust discharging efficiency directed to the dusts in the air flow "R" is increased. Furthermore, if desired, as is shown in FIG. 13, another arrangement may be employed. That is, as is shown in the drawing, at least the end portion of the air guide wall 57, which forms end portions of the cuts 23a and 24a of the partition defining walls 23 and 24, is so inclined that an incidence angle "θ" of the direction of the air flow "R" relative to the end portion shows an obtuse angle. With this arrangement, the air flow "R" impinging upon the end portion of air guide wall 57, which end portion is defined by the end portions of the cuts 23a and 24a, is suppressed from running toward the disc containing portion 21.

As is shown in FIG. 2, at the lower part of the cartridge body 4 of the disc cartridge 1 of the present invention, there are formed first and second positioning holes 59 and 60 which, for achieving a positioning of disc cartridge 1 relative to a disc player, receive positioning pins of the disc player when the disc cartridge 1 is set in the disc player. These positioning holes 59 and 60 are provided near the front wall 15 at lateral positions between which the shutter member 28 moves. The first positioning hole 59 is shaped circular in order to correspond to a circular cross section of the associated positioning pin, and the second positioning hole 60 has an elongate shape in order to correct the engaging position thereof relative to the associated positioning pin, the major axis of the second positioning hole 60 extending in a direction along which the shutter member 28 moves.

As is seen from FIG. 2, at one corner of the lower part of the cartridge body 4 near the back wall 16, an erroneous writing protection member 61 is movably arranged. The erroneous writing protection member 61 moves to open and close an erroneous writing protection hole 62 formed in the cartridge body 4 so as to select a condition wherein writing information on the magnetic disc 5 is possible or another condition wherein writing information on the magnetic disc 5 is impossible.

Furthermore, as is seen from FIG. 2, at the other corner of the lower part of the cartridge body 4 near the back wall 16 and at a portion of the lower part near the first positioning hole 59, there are formed first and second recording capacity discriminating holes 63 and 64 which indicate a recording capacity possessed by the magnetic disc 5.

Furthermore, as is seen from FIG. 2, at the other corner of the lower part of the cartridge body 4 near the back wall 16 and at a portion of the lower part near the first positioning hole 59, there are formed first and second recording capacity discriminating holes 63 and 64 which indicate a recording capacity possessed by the magnetic disc 5.

Furthermore, as is seen from FIG. 1, at the other corner of the upper part of the cartridge body 4 near the front wall 15, there is provided an insertion protection portion 65 which can prevent insertion of a different type of disc cartridge in the disc player, the different type of disc cartridge having therein a magnetic disc whose recording capacity is different from that of the magnetic disc 5 installed in the disc cartridge 1 according to the present invention. The insertion protection portion 65 is shaped into a recess whose front end directed toward the front wall 15 of the cartridge body 4 is open.

As is seen from FIGS. 5 and 6, at respective corners of the inner surface of each of the upper and lower body halves 2 and 3 of the cartridge body 4, there are formed bosses 66 and 67 which are mated and welded upon coupling of the halves. That is, for coupling the halves 3 and 4 to produce the cartridge body 4, the bosses 66 and 67 are mated and the raised walls 19 and 20 are mated, and these mated portions of them are welded by means of an ultrasonic welding or the like.

Figure 14:
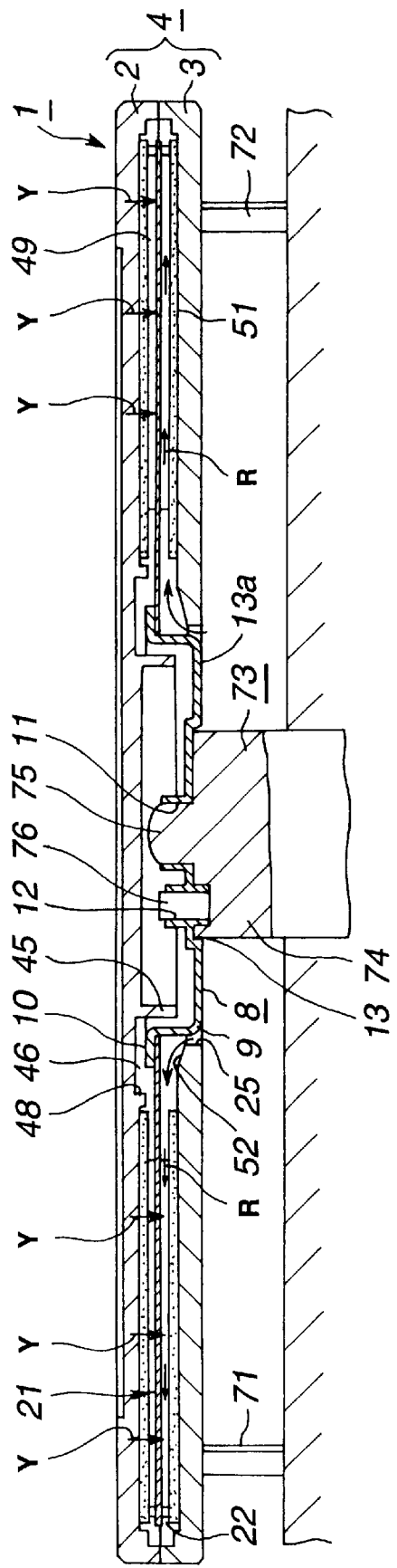
FIG. 14 is a sectional view of the disc cartridge of the invention under a condition wherein the disc cartridge is set in a disc player and a magnetic disc is rotated therein.

As is seen from FIG. 14, when the disc cartridge 1 having the above-mentioned structure is set into an information writing and/or reading disc player designed to play the disc cartridge 1, the first and second positioning holes 69 and 70 become into engagement with the positioning pins 71 and 72 of the information writing and/or reading disc player thereby to achieve a horizontal positioning of the disc cartridge 1 relative to the player, and at the same time, corner portions of the cartridge body 4 near the back wall 16 are brought into engagement with vertically positioning pins (not shown) of the player thereby to achieve a vertical positioning of the disc cartridge 1 relative to the player.

As is seen from FIG. 14, when the disc cartridge 1 is set into the information writing and/or reading disc player, the center core 8 projected into the center opening 25 formed in the lower part of the cartridge body 4 becomes put on a disc table 74 of a disc driving mechanism 73 of the disc player, and at the same time, the spindle shaft engaging opening 11 is brought into engagement with a spindle shaft 75 of the disc driving mechanism 73. Under this condition, the disc mounting portion 13 provided at the bottom portion 9a of the projected portion 9 of the center core 8 is snugly put on the disc table 74 to mate therewith, and at the same time, the disc mounting portion is attracted toward the disc table 74 by means of a magnet fixed to the disc table. With this, the magnetic disc 5 becomes ready for rotation with the disc table 74.

When, with the magnetic disc 5 being mated with the disc table 74, a spindle motor (not shown) of the disc driving mechanism 73 is energized to rotate the disc table 74, a driving pin 76 formed on the disc table 74 is brought into engagement with the drive pin engaging opening 12 due to a relative rotation between the magnetic disc 5 and the disc table 74 which inevitably occurs at an initial stage of such rotation, the driving pin being provided at a portion eccentric to the spindle shaft 75. By the engagement between the driving pin 76 and the drive pin engaging opening 12, the magnetic disc 5 can be positioned relative to the spindle shaft 75, so that the magnetic disc 5 can rotate about an axis of the spindle shaft 75 synchronizing with the rotation of the disc table 74.

Since the magnetic disc 5 is put on the disc table 74 through the disc mounting depressed portion 13 of the center core 8, undesired displacement of the magnetic disc relative to the disc table 74 is suppressed and the spindle shaft engaging opening 11 can be easily engaged with the spindle shaft 75. Furthermore, during the time needed by the driving pin 76 until it fully engages with the drive pin engaging opening 12, undesired displacement of the magnetic disc relative to the disc table 74 can be suppressed or at least minimized.

In a condition wherein the disc cartridge 1 is set in the information writing and/or reading disc player while assuring the horizontal and vertical positioning thereof relative to the player, and wherein the spindle shaft engaging opening 11 is engaged with the spindle shaft 75, and wherein the drive pin engaging opening 12 is engaged with the driving pin 76, and wherein the magnetic disc 5 is mounted on the disc table 74 to be ready for rotation with the disc table 5, the magnetic disc 5 is lifted from the lower body half 3 of the cartridge body 4 and placed at a generally middle position in the direction of the thickness of the cartridge body 4, as shown in FIG. 14. When the disc cartridge 1 is about to enter the information writing and/or reading disc player, the shutter member 28 is moved in the direction of the arrow "A" of FIGS. 1 and 2 against the biasing force of the coil spring 43 due to function of a shutter opening mechanism provided by the player, resulting in that the first and second writing and/or reading apertures 26 and 27 are opened. At the same time, the discharge opening 55 provided at the front wall 15 of the cartridge body 4 is also opened, as is seen from FIG. 10.

In the disc cartridge 1 according to the present invention, there is no need of employing a lifter such as a plate spring which has bee used in the conventional disc cartridge for pressing a protecting sheet against the magnetic disc, and in the disc cartridge of the invention, the surface facing the disc proper 6 in the disc containing portion 21 of the cartridge body 4 is flat. Accordingly, the magnetic disc 5 can be rotated without contacting the protection sheets 49 and 50 and parts of the cartridge body 4.

The magnetic disc 5 set and positioned in the disc drive mechanism 73 is rotated at a speed higher than 3000 rpm. In case of the disc cartridge of the present invention, the magnetic disc 5 is rotated at a speed ranging from 3000 rpm to 3600 rpm.

When the magnetic disc 5 is rotated at a high speed ranging from 3000 rpm to 3600 rpm, there is produced in the disc containing portion 21 an air flow in the rotation direction of the magnetic disc 5. As is shown in FIGS. 11 to 13, the air flow is forced to impinge upon the air guide wall 57 or 58 and discharged to the outside from the discharge opening 55 causing dusts in the air flow "R" to be discharged to the outside from the discharge opening 55 together with the air flow "R". Thus, the magnetic disc 5 and the magnetic head in the disc containing portion 21 are protected from the dusts. As is seen from FIG. 14, the air flow in the disc containing portion 21 induces an air suction at the center opening 25 formed in the lower part of the cartridge body 4, which brings about generation of spirally flowing pressurized air flow "R" between the inner surface of the lower body half 3 of the cartridge body 4 and the magnetic disc 5, the pressurized air flow "R" functioning to lift up the magnetic disc 5 toward the upper body half 2. When the magnetic disc 5 is lifted up toward the upper body half 2, the air placed between the magnetic disc 5 and the upper body half 2 becomes pressurized because the upper part of the cartridge body 4 is covered with the upper body half 2 which has only the first writing and/or reading aperture 26. Due to the pressurized air, the magnetic disc 5 is biased in the direction of the arrows "Y" in FIG. 14, that is, toward the lower body half 3.

Due to presence of both the air flow "R" which is generated between the lower body half 3 and the magnetic disc 5 to lift up the magnetic disc 5 upon high speed rotation of the magnetic disc 5 and the air which is pressurized between the magnetic disc 5 and the upper body half 2 due to the lifting of the magnetic disc 5, undesired vibration of the magnetic disc 5 is suppressed and thus the magnetic disc 5 can be smoothly rotated without contacting the inner surfaces of the cartridge body 4.

Since the magnetic disc 5 is prevented from the vibration and the disc 5 is smoothly rotated without contact the inner surfaces of the cartridge body 4, the sliding contact between the magnetic head by which writing and/or reading of information are carried out and the magnetic disc 5 can be stably and appropriately kept. Thus, information writing on the magnetic disc and information reading from the disc are appropriately carried out with improved writing and/or reading characteristics. Furthermore, undesired wearing of the magnetic head and the magnetic disc 5 can be minimized and thus the magnetic head and the magnetic disc can be protected.

The size of the discharge opening 55 can be varied in order to adjust the air flow "R" which is generated between the lower body half 3 and the magnetic disc 5 to lift up the magnetic disc 5 and the air which is pressurized between the magnetic disc 5 and the upper body half 2 due to the lifting movement of the magnetic disc 5.

Although the above description has been directed to the disc cartridge 1 of a type having a magnetic disc 5 installed therein, the present invention can be widely applied to various types of disc cartridge so long as a disc installed therein is rotated at a speed higher than 3000 rpm. In case of these disc cartridges, advantages similar to those possessed by the above-mentioned disc cartridge are obtained.
Industrial Field Where Invention is Used The present invention is applicable to disc cartridges of a type which, to meet the need of writing and/or reading a great quantity of information, needs a disc such as a floppy disc to rotate at a higher speed.

SUMMARY

A disc cartridge comprises a disc having at a center portion thereof a center core for being chucked by a drive mechanism, the disc being rotated at a speed higher than 3000 rpm when put on and driven by the drive mechanism; and a cartridge body having the disc rotatably installed therein. The cartridge body has in a lower part thereof a center opening through which the center of the disc is exposed to the outside of the cartridge body, and has in mutually facing portions of upper and lower parts thereof paired writing and/or reading apertures each extending radially outward to expose at least a part of the signal writing zone of the disc to the outside, and has between the upper and lower parts thereof a partition wall which surrounds substantially entire periphery of the disc. The partition wall has a cut portion at a position downstream of the writing and/or reading apertures with respect to the rotation direction of the disc, and the cut portion is connected through a discharge passage to a discharge opening formed in a front wall of the cartridge body.

What is claimed is:

1. A disc cartridge characterized by:
    a disc having at a center portion thereof a center core for being chucked by a drive mechanism, said disc being rotated at a speed higher than 3000 rpm when put on and driven by said drive mechanism; and
    a cartridge body having said disc rotatably installed therein,
    said cartridge body having at a center portion of a lower part thereof a center opening through which the center core is exposed to the outside of the cartridge body, and having at mutually facing portions of upper and lower parts thereof paired writing and/or reading apertures each extending radially outward to expose at least a part of the signal writing zone of the disc to the outside, and having a shutter member for opening and closing said writing and/or reading apertures, said shutter member having a generally U-shaped cross section, and having between the upper and lower parts thereof a partition wall which surrounds substantially entire periphery of the disc,
    said partition wall having a cut portion near said writing and/or reading apertures at a position downstream of said writing and/or reading apertures with respect to the rotation direction of the disc,
    said cut portion being connected through a discharge passage to a discharge opening formed in a front wall of the cartridge body, and
    said discharge opening being located at a position which is covered by a cartridge holding portion of the shutter member when said shutter member is in a position to close said writing and/or reading apertures.

2. A disc cartridge as claimed in claim 1, which is further characterized in that said discharge passage is formed with an air guide wall which extends from a downstream end of the cut portion of the partition wall with respect to the rotation direction of the disc to the discharge opening.

3. A disc cartridge as claimed in claim 2, which is further characterized in that the air guide wall is arranged perpendicular to the direction in which the air flow generated upon rotation of the disc runs.

4. A disc cartridge as claimed in claim 2, which is further characterized in that the air guide wall is so inclined that an incidence angle of the direction of the air flow relative to the air guide wall, which faces toward the discharge opening, shows an obtuse angle.

5. A disc cartridge as claimed in claim 2, which is further characterized in that at least one end portion of the air guide wall at the side of the cut portion of the partition wall is so inclined that an incidence angle of the air flow relative to the end portion, which faces toward the discharge opening, shows an obtuse angle.

6. A disc cartridge characterized by:

a disc having at a center portion thereof a center core for being chucked by a drive mechanism, said disc being rotated at a speed higher than 3000 rpm when put on and driven by said drive mechanism; and a cartridge body having said disc rotatably installed therein, said cartridge body having at a center portion of a lower part thereof a center opening through which the center core is exposed to the outside of the cartridge body, and having at mutually facing portions of upper and lower parts thereof paired writing and/or reading apertures each extending radially outward to expose at least a part of the signal writing zone of the disc to the outside, and having a shutter member for opening and closing said writing and/or reading apertures, said shutter member having a generally U-shaped cross section, and having between the upper and lower parts thereof a partition wall which surrounds substantially entire periphery of the disc, said partition wall having a cut portion near said writing and/or reading apertures at a position downstream of said writing and/or reading apertures with respect to the rotation direction of the disc, said cut portion being connected through a discharge passage to a discharge opening formed in a front wall of the cartridge body, said discharge opening being located at position which is covered by the shutter member when the shutter member is in a position to close said writing and/or reading apertures, and said cartridge body being provided at inner surfaces of the upper and lower parts thereof with protection sheets, said protection sheets being bonded to the inner surfaces of the upper and lower parts, so that when the center core of said disc is chucked by the disc drive mechanism, the protection sheets are kept away from the disc without contacting the same.

* * * * *